US008965350B2

(12) United States Patent
Agsteiner et al.

(10) Patent No.: US 8,965,350 B2
(45) Date of Patent: Feb. 24, 2015

(54) CONFERENCE SYSTEM AND ASSOCIATED SIGNALLING METHOD (75) Inventors: Florian Agsteiner, Unterhaching (DE); Tobias Haeberle, Garching (DE); Matthias Hanel, Pförring (DE); Adnane Jadid, München (DE); Thomas Lederer, Herrsching (DE); Maximillian Reiss, München (DE)

(73) Assignee: Unify GmbH & Co. KG, Munich (DE)

( * ) Notice: Subject to any disclaimer, the term of this patent is extended or adjusted under 35 U.S.C. 154(b) by 305 days.

(21) Appl. No.: 13/379,447

(22) PCT Filed: Dec. 10, 2010

(86) PCT No.: PCT/EP2010/007534
§ 371 (c)(1),
(2), (4) Date: Jan. 24, 2013

(87) PCT Pub. No.: WO2011/069668
PCT Pub. Date: Jun. 16, 2011

(65) Prior Publication Data
US 2013/0165088 A1    Jun. 27, 2013

(30) Foreign Application Priority Data

Dec. 10, 2009    (DE) .......................... 10 2009 057 725

(51) Int. Cl.
*H04W 88/02*    (2009.01)
*H04M 1/725*    (2006.01)
(Continued)

(52) U.S. Cl.
CPC ............ *H04M 1/72544* (2013.01); *H04W 4/16* (2013.01); *G06F 3/017* (2013.01);
(Continued)

(58) Field of Classification Search
USPC .................. 455/416, 456.9, 556.1; 715/773; 345/173
See application file for complete search history.

(56) References Cited

U.S. PATENT DOCUMENTS

2006/0098085 A1    5/2006    Nichols et al.
2007/0133774 A1    6/2007    Fujimoto
(Continued)

FOREIGN PATENT DOCUMENTS

CN    1543123 A    11/2004
CN    1946165 A    4/2007
(Continued)

OTHER PUBLICATIONS

International Preliminary Report on Patentability for PCT/EP2010/007534 dated Jun. 12, 2012 (Forms PCT/IB/373 and PCT/ISA/237 (German Translation).
(Continued)

*Primary Examiner* — Diane Mizrahi
(74) *Attorney, Agent, or Firm* — Buchanan Ingersoll & Rooney PC (57) ABSTRACT The conference system (KS) comprises at least two mobile terminals (M1, M2, M3) with a respective signalling apparatus which contains a sensor which detects motion by the signalling apparatus and outputs a corresponding motion signal. In addition, it contains a motion signal processing apparatus which associates the motion signal from a gesture in nonverbal interhuman communication with a motion signal pattern and, as a result of an association having been made, produces an output signal with a corresponding piece of information about the type of detected gesture in the nonverbal interhuman communication. Furthermore, the conference system (KS) contains a transmission apparatus for supplying the output signal to a transmission channel (F1, F2, F3) which is respectively connected to a local area network (LAN). The latter has a telephone, preferably an IP telephone (11), for a moderator and also a screen (U1) for conference control connected to it. Furthermore, an associated signalling method is proposed.

20 Claims, 5 Drawing Sheets (51) Int. Cl.
*H04W 4/16* (2009.01)
*G06F 3/01* (2006.01)
*H04M 1/253* (2006.01)
*H04M 3/56* (2006.01)

(52) U.S. Cl.
CPC ....... *H04M 1/2535* (2013.01); *H04M 1/72569* (2013.01); *H04M 3/56* (2013.01); *H04M 2250/12* (2013.01); *H04M 2250/62* (2013.01)
USPC ........................................................ 455/416

(56) References Cited

U.S. PATENT DOCUMENTS

| 2008/0158334 | A1 | 7/2008 | Reponen et al. | |
| 2009/0009588 | A1 | 1/2009 | Shaffer et al. | |
| 2010/0124949 | A1* | 5/2010 | Demuynck et al. | 455/569.1 |
| 2010/0225599 | A1* | 9/2010 | Danielsson et al. | 345/173 |
| 2011/0037712 | A1* | 2/2011 | Kim et al. | 345/173 |
| 2011/0273388 | A1* | 11/2011 | Joo et al. | 345/173 |
| 2011/0279393 | A1* | 11/2011 | Okada et al. | 345/173 |

FOREIGN PATENT DOCUMENTS

| DE | 102007058586 A1 | 6/2008 |
| JP | 1141578 A | 2/1999 |
| WO | 2006107463 A1 | 10/2006 |
| WO | 2008138407 A1 | 11/2008 |

OTHER PUBLICATIONS

International Preliminary Report on Patentability for PCT/EP2010/007534 dated Jun. 12, 2012 (Forms PCT/IB/373 and PCT/ISA/237 (English Translation).
International Search Report for PCT/EP2010/007534 dated Mar. 14, 2011 (Form PCT/ISA/210) (German Translation).
Written Opinion of International Searching Authority for PCT/EP2010/007534 dated Mar. 14, 2011 (Form PCT/ISA/237) (German Translation).

* cited by examiner

CONFERENCE SYSTEM AND ASSOCIATED SIGNALLING METHOD

CROSS-REFERENCE TO RELATED APPLICATIONS

This application is the U.S. national phase under 35 U.S.C. §371 of PCT International Patent Application No. PCT/EP2010/007534, filed on Dec. 10, 2010, and claiming priority to German Application No. DE 102009057725.4, filed on Dec. 10, 2009.

BACKGROUND OF THE INVENTION

1. Field of the Invention

The invention relates to a conference system comprising at least two mobile terminals, each having a signal-transmitting device and an associated signaling method.

2. Background of the Related Art

In the current state of the art, mobile terminals used for interpersonal communication, such as mobile phones, smart phones, PDAs, tablet PCs and laptops, are operated in various ways. User input can be entered via keyboard, input devices, voice control, computer or by other means. Also known is control of device functions via movements of an input device, such as a finger on a touch-sensitive user interface. It also possible to move the terminal in order to affect the display mode of the mobile terminal, for example, from a portrait display format to a landscape format; see, for example: Apple iPhone. However, the current control and input devices and methods in connection with mobile terminals used for interpersonal communication have the disadvantage that they are not accessible to interpersonal nonverbal communication gestures for control or input purposes. Such interpersonal nonverbal communication gestures, in particular non-specific types of gestures, remain inaccessible to mobile communication terminals at the current state of the art.

WO 2006/107463 A1 discloses a method and a device for visual presentation, which determines and displays communication attributes stemming from a voice connection to a communication device. In addition, WO 2008/138407 A1 discloses a mobile terminal with a WLAN transceiver and a motion sensor, whereby a multimedia object is generated by the detected motion.

In today's professional life, e.g., in the industry, increasingly telephone and video conferences are conducted for joint voting or for efficient and timely dissemination of information. It is definitely possible for conference calls to reach a larger number of participants, e.g., 10 or 20 participants and in larger companies possibly even many more.

Conference systems, so-called conference bridges, allow for different modes of operation; e.g., all participants can communicate bi-directionally, i.e., speak at the same time as well as hear all other participants. It is possible for participants to bring in interfering ambient noise, which significantly disturbs the quality of the conference acoustics. Therefore, employing the mode known as a moderated conference can be useful, i.e., moderators can mute or unmute participants.

The moderator has an overview of all participants and can execute this function via a control application that is connected to the conference system; in other words, he can give somebody the floor. To be able to speak, the participant must then call the moderator on an additional phone, e.g., on the moderator's mobile phone, in order to indicate that he would like to be unmuted and be able to speak in the conference.

SUMMARY OF THE INVENTION

Embodiments herein may provide a conference system and an associated signaling method that expands the spectrum of human communication via mobile terminals.

Embodiments may offer the advantage that muted conference participants can now make a request to speak in order to participate actively in a discussion, wherein the request to speak is made possible from a mobile phone through a gesture, e.g., shaking or sudden lifting, which functions like raising a hand.

The conference system comprises at least two mobile terminals each with a signaling device that contains a sensor, which detects a movement of the signaling device and outputs a corresponding motion signal. Also included therein is a motion signal processing device that associates the motion signal from a nonverbal interpersonal communication gesture with a motion signal pattern, and based on that association generates an output signal with corresponding information about the type of the detected nonverbal interpersonal communication gesture. Furthermore, the conference system includes a transmitting device for supplying the output signal to a transmission channel that is connected to a Local Area Network. Connected to it is a telephone, preferably an IP phone (11), for a moderator as well as a monitor for controlling the conference.

Additional advantageous embodiments of the invention are set forth in the dependent claims.

Furthermore, a signaling device for mobile terminals that is suited for interpersonal communication is used, which contains a sensor that detects a motion of the signal-transmitting device and outputs a corresponding motion signal. In addition, the signaling device includes a motion signal processing device that associates the motion signal with a nonverbal interpersonal communication gesture (this includes in particular gestures based on the movement of body parts for the purpose of interpersonal communication or establishing contact). This is done by comparison to stored motion patterns. After successful association, an output signal with corresponding information is generated, such as whether a gesture is present and/or which one.

The signal-transmitting device further includes a transmitting device for supplying the output signal to a transmission channel. This may be a wireless or a wired transmission channel or a combination thereof. The motion signal processing device associates the motion signal with a motion signal pattern. This can be a stored motion signal pattern or one that is known to the signaling device. Furthermore, the motion signal processing device generates an output signal that contains information about the type of the detected nonverbal interpersonal communication gesture. The output signal also contains additional information, in particular information that offers an indication about the originator of the motion signal. The motion signal processing device is capable of detecting nonverbal human gestures for attracting attention, in particular waving and/or shaking, and/or a message due to a movement of the signaling device. Advantageously, the motion signal processing device can recognize user-specific motion signal patterns and/or store them in the signal-transmitting device, especially for a subsequent new association.

Furthermore, according to one advantageous embodiment of the invention, the sensor and/or the motion signal processing device is designed such that unintended nonverbal interpersonal communication gestures are suppressed, so that they do not lead to a motion signal and/or an output signal.

In another advantageous embodiment of the invention, the signaling device processes and/or stores the motion signal patterns from an external data source that is not a component of the signal-transmitting device.

In this embodiment, the transmission channel is formed between the transmitting device and a receiving device, with the receiving device separated from the signaling device. For example, the transmission channel can consist of a radio link.

The transmitting and receiving devices are spatially apart.

In addition, the conference system includes a signaling device for controlling the conference, containing an output device that outputs the information of the output signal, which corresponds to the nonverbal interpersonal communication gesture. The signaling device also contains an output signal processing device, which generates the information that corresponds to the nonverbal interpersonal communication gesture based on the output signal. The signaling device further includes a receiving device, which receives the output signal. This can be a part of the output signal processing device, for example.

Further, according to an advantageous embodiment of the invention, the information that is preferably output to a user of the signaling device can additionally provide an indication about the originator of the motion signal. In another advantageous embodiment of the invention, the information that is to be output is generated based on signal patterns stored in the output signal processing device, especially by associating such a signal pattern with the output signal. According to further advantageous embodiments of the invention, information is output visually by means of a signaling device suitable for this purpose, in particular a screen, acoustically by means of a signaling device suitable for this purpose, and/or by means of a signaling device that produces haptic stimuli, particularly vibration.

It is also possible, according to an advantageous embodiment of the invention, for the signaling device to process signal patterns from an external data source that is not part of the signaling device.

According to another aspect of the invention, a signaling method is recommended for the conference system, wherein, as a first step, said signaling method provides detection of a movement of a signal-transmitting device and the output of a motion signal. In a second step, the motion signal is associated with a nonverbal interpersonal communication gesture and in a third step generates an output signal in case an association was made, which contains information that corresponds to the nonverbal interpersonal communication gesture. Provided as a fourth step is: Transmitting the output signal via a transmission channel. Provided as a fifth step is: Receiving the output signal that has been transmitted via the transmission channel.

Yet another advantageous embodiment of the invention proposes a signaling method that provides, as a first step, the generation of information based on the output signal, whereby the information corresponds to the nonverbal interpersonal communication gesture, and which provides as a second step the output of the information.

Additional features and advantages of the invention become apparent from the following description of exemplary embodiments of the invention based on the diagrams in the drawing, which show details essential to the invention, and from the claims. The individual features can be implemented separately or collectively in any combination in a variant of the invention.

BRIEF DESCRIPTION OF THE DRAWINGS

Preferred embodiments of the invention are explained in more detail below based on the drawings. The figures show.

In the following description and the drawings, like reference characters correspond to elements with the same or comparable functions.

DETAILED DESCRIPTION OF THE INVENTION

In the context of the present invention, the term gesture refers to the meaningful movement of one or more certain body parts of a person, mainly used for communication, establishing contact and similar purposes. In this case, the gesture as a part of human gesticulation is distinguished from the movements of facial expressions. Here, the meaning of the term gesture is close to the meaning of the term 'moving a body part' and differs from it possibly by the fact that gestures may at times be associated with a certain symbolism.

The term "Interpersonal communication" in this context refers primarily to communication between one person and another, i.e., the—in particular bidirectional—interaction of individuals.

Figures 1, 2:
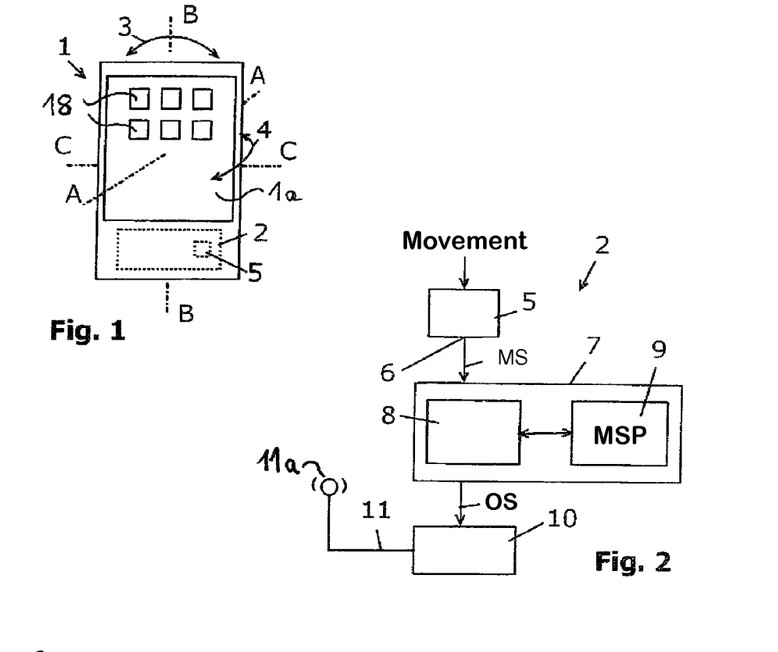
FIG. 1: an embodiment of a mobile terminal with a signal-transmitting device to illustrate the invention.
FIG. 2: schematically, another embodiment of a mobile terminal with a signal-transmitting device to illustrate the invention.

FIG. 1 shows an example of a mobile terminal 1 with a screen 1 a displaying icons 18, said terminal including a signal-transmitting device 2. The mobile terminal, for example a personal digital assistant (PDA), mobile phone, smart phone, tablet PC or similar device, is suited to establish communication links with other devices via a transmission channel for the purpose of interpersonal communication. Such communication links comprise, for example, telephone connections, particularly wireless and wired connections, Internet connections, voice-over-IP connections, as well as connections for remote data transmission, for example. These devices can be used, for example, to connect with several communication participants, e.g., in web conferencing or telephone conferencing.

The signal-transmitting device 2 is preferably integrated into a mobile terminal 1, wherein said device utilizes, for example, the technical features of said terminal such as antenna, power supply, display device, etc. However, the device 2 can also be an independent, separate device that is not part of a mobile terminal.

Preferably, in particular during operation, the signal-transmitting device 2 is well suited to be moved by a user, for example, by holding and moving it with the hand. The signal-transmitting device 2 and/or the receiving mobile terminal 1, has, for example, low weight and a handy design, and so is preferably designed as a handheld or portable device. Movements in the direction of the arrow 3 around an axis A are possible, for example, just as much as those in the direction of the arrow 4 around an axis B or those around an axis C. Furthermore, movements can be carried out with the signal-transmitting device 2 in which said device is moved lengthwise, crosswise, or linearly.

The signal-transmitting device 2 includes a sensor 5, such as an acceleration sensor, that detects a movement of the signal-transmitting device 2 caused by a movement of a user. Due to a detected motion, the sensor 5 provides a motion signal MS to an output 6 or supplies such a signal, see FIG. 2. This motion signal MS that corresponds with the movement is fed to or retrieved by a signal processing device 7.

The motion signal processing device 7 includes, for example, a processing unit, e.g., a computerized processing unit such as a signal processor 8. The motion signal processing device 7 interprets the motion signal MS from the sensor 5 to determine whether a motion signal pattern MSP is present in the motion signal MS that can be associated with a nonverbal interpersonal communication gesture in particular. For this purpose, the motion signal processing device 7 can, for example, compare the motion signal MS to defined motion signal patterns MSP for such gestures, which may be stored in and retrievable from a memory device 9, for example, or which are known to the motion signal processing device 7. The storage device 9 may be part of the signal-transmitting device 2, in particular part of the motion signal processing device 7, but can also be an external data source, for example.

Furthermore, the motion signal processing device 7 interprets the motion signal MS, preferably determining the type of the gesture to be associated with the motion signal MS. Such nonverbal interpersonal communication gestures are, for example, those of a person drawing attention based on a movement of a body part, such as: waving a hand, shaking a hand, tilting the hand/arm or, for example, raising an arm (the motion signal MS of a gesture is generated by moving the signal-transmitting device 2 along with the hand as described above). However, any other types of such gestures are conceivable. Such interpersonal gestures as described above are expected, for example, where users of the signal-transmitting device 2 want to draw attention to themselves, e.g., in conferences, in emergencies, etc.

For example, a gesture could be beckoning to a participant in a conference, placing a bid in an auction by raising a hand, giving call waiting signal to a participant who has muted his communications device, a message/notification to the moderation administration of a conference, signaling a request to speak in a conference, the interpretation of the intensity of shaking as an emotion for the evaluation function (such as analogous to clapping), and the mixing of a sort sequence, for example.

In the case where association of the motion signal MS with a defined motion signal pattern MSP is possible or does occur, the motion signal processing device 7 outputs an output signal OS that contains information corresponding to the association. For example, the output signal OS contains the information that a nonverbal interpersonal communication gesture was recognized by association or is present, based on the motion signal MS. In addition, the output signal OS preferably also contains information as to which type of gesture has been detected or is present.

In an exemplary preferred embodiment, the signal-transmitting device 2 also contains a transmitting device 10, which supplies the generated output signal OS with the information contained therein to a transmission channel 11, which establishes or ensures a connection to another mobile device, for example, or to another device for interpersonal communication, for example. In particular, the transmission channel may establish a connection to a signaling device 13 described below in connection with FIG. 4, for example. The transmitting device 10 can have, for example, conventional means for preparing the output signal for the purpose of transmission such as means of encoding (e.g., D/A or A/D converters) and/or of amplifying the output signal, filtering, etc.

Furthermore, the transmitting device 10 can have an antenna 11a or a port for a wired transmission channel 11.

The transmission channel 11 can be a transmission channel that is common in communications technology, e.g., wireless in the form of a radio link or wired or both. The transmission channel 11 can be realized in many fashions, and can be formed by using standard protocols and methods, for example. Both analog and digital transmission channel designs are conceivable. In general, the transmission channel 11 is formed between a transmitting device 10 and a receiving device, particularly if they are spatially separated or removed from each other.

Figure 3:
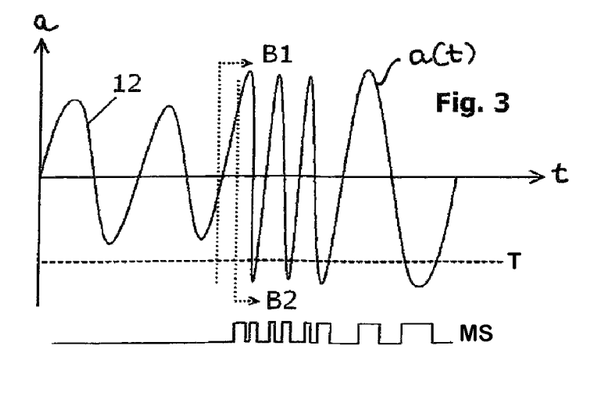
FIG. 3: schematically, a signal from a sensor of a signal-transmitting device according to FIG. 1 and/or FIG. 2 to illustrate the invention.

A possible motion signal MS is exemplified in FIG. 3 as the amplitude a(t) over time t. As seen from the progression of the curve 12, the sensor 5 responds to a certain movement of the signal-transmitting device 2, for example with a frequency change (area B1) and a modified (in this case larger) amplitude a (area B2) in the waveform 12. These changes in the waveform 12 are reproducible by repeating the respective movements. The reproducibly modified waveform 12 can be stored, for example as a motion signal pattern MSP, e.g., as a curve progression or in digitized form. Preferably, the signal portions above a threshold level T, for example, are captured (clipping, cutting off signal peaks) and provided, for example, as a digital motion signal MS, such that motion signal patterns MSP can be obtained that can be associated with a gesture corresponding to the particular motion of the motion signal MS. Also shown is a threshold T in the form of a dashed line. If the motion signal amplitudes a(t) are below it, no motion signal MS is output, for example.

The motion signal patterns MSP generated from motion signals MS can be stored in the signal-transmitting device 2. However, it is also conceivable to supply motion signal patterns MSP from an external data source to the signal-transmitting device 2 in order to enable the signal-transmitting device 2 to make a then possible association of the motion signal patterns MSP obtained from the data source with the related gestures. The external data source can be a memory card, a memory unit of an additional signal-transmitting device 2, an internal web-based storage or network storage unit, etc., for example. It is also within the scope of the invention for the signal-transmitting device 2 to be self-learning. This can be accomplished, for example, by a user making a nonverbal interpersonal communication gesture, while the signal-transmitting device 2 captures the generated motion signal MS via the sensor 5 and stores it as motion signal pattern MSP, e.g., in the signal-transmitting device 2. User-specific gestures can be captured in this manner.

It is also within the scope of the invention for the signal-transmitting device 2 to distinguish between intentional and unintentional gestures. Consequently, motion signals MS of unintentional gestures, for example, can be suppressed. For example, the intensity of a captured signal can be used to make such a distinction. If the movement is unintentional, the sensor 5 will typically detect a weak signal, as the motion amplitude or the signal intensity will be low. If this signal remains below the threshold T, the sensor will not output a motion signal MS. However, in a case when the sensor 5 captures a strong signal, as a result of a deliberate movement or an intentional gesture of higher intensity, a motion signal MS is generated. In this case, the signal peaks are above the threshold T (area B2), for example.

The output signal OS can also be supplemented with additional information before it is made available, e.g., via a transmission channel. For example, it may be useful to add a user ID in order to be able to provide information about the sender of the output signal to a recipient of the signal. For example, this functionality can be provided by an extended feature set of the motion signal processing device 7 or the processing unit, for example. Also conceivable are additional, e.g., signal-transmitting or signal-shaping elements that are assigned to the signal-transmitting device 2 for this purpose.

The output signal OS, which was generated by the signal-transmitting device 2 and which preferably includes information corresponding to the detected gesture that was generated based on the association made, is transferred to a signaling device 13 (FIG. 4) according to the invention for signaling purposes. The transfer can be accomplished by means of a transmitting device 10 via the transmission channel 11, for example. However, it is also conceivable for the motion signal processing device 7 to provide the output signal OS at a signal output point for retrieval by the signaling device 13. This is conceivable, for example, if the signaling device 13 and the signal-transmitting device 2 are housed in a joint device unit, e.g., a mobile terminal 1, whereby the information that corresponds to a motion can also be displayed to the originator of said motion, for example.

Figure 4:
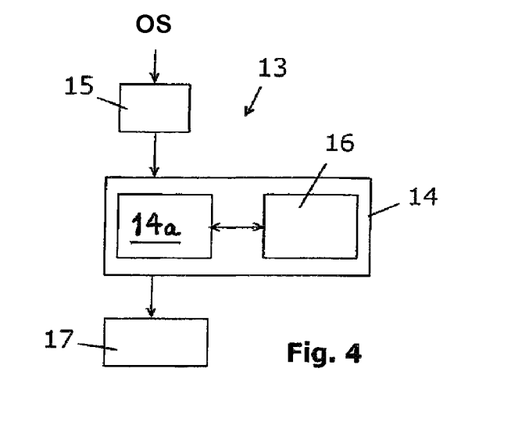
FIG. 4: schematically, an embodiment of a signaling device to illustrate the invention.

The signaling device 13 is preferably housed in a mobile terminal 1 of the type described above. The signaling device 13 preferably comprises an output signal processing device 14, which processes the output signal OS that was captured at a signal input point of the output signal processing device 14. For capturing purposes, the signaling device 13 can make use of a receiving device 15, such as a receiving device 15 located in the signaling device 13. The receiving device 15 may be designed in a usual manner and depending on the transmission channel used may have filters, amplifier elements, antenna elements, A/D or D/A converters, etc. This output signal OS captured by the receiving device 15 is preferably made available to the output signal processing device 14.

The output signal processing device 14 includes, for example, a processing unit in the form of a signal processor 14a, which obtains the information contained in the output signal OS, which corresponds to a gesture according to the association made with the motion signal MS from the output signal OS. To obtain the information from the output signal OS, a memory device 16 can be provided in addition to the processing unit, e.g., in the signaling device 13 or in the output signal processing device 14, with the memory content allowing for an association of the received output signal OS with the defined gesture-specific information contents. Upon receipt of an output signal OS, the output signal processing device 14 compares, for example, the output signal to the signal patterns stored in the memory device 16, and if the output signal and stored signal patterns match or are successfully associated, retrieves the stored information associated with the stored signal pattern for signaling and/or output, whereupon the output signal OS is decoded at the signaling device.

After obtaining the information from the output signal OS, the information is processed by the output signal processing device 14 preferably as a signal, such that the information can be output via an output device provided for this purpose, for example to a human user or communication participant.

As an additional component, the signaling device includes for this purpose preferably an output device 17 for outputting the information to be signaled. The processed information signal is provided or supplied to the output device from an output of the output signal processing device 14. The output device 17 may be, in conventional manner, an imaging device such as a screen, a sound-emitting element such as a speaker, an element triggering haptic stimuli such as a vibrating device or a typical device suitable for signaling to a human user, or a combination of several such elements.

Figure 5:
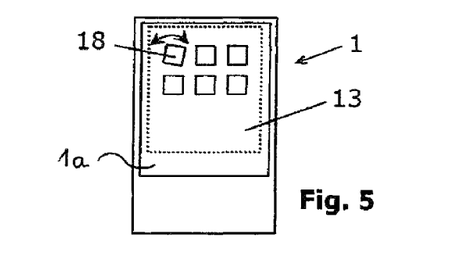
FIG. 5: another embodiment of a mobile terminal with a signaling device to illustrate the invention.

To visualize the information, a mobile terminal 1 may cause an icon 18 to move back and forth on a display screen 1a of the signaling device 13 when receiving an output signal OS, which contains the information of the presence of a message gesture such as the stretching of a user's arm (see FIG. 5). It is furthermore provided to have the signaling device 13 vibrate, for example, based on such a gesture, for example, in order to inform the user of the signaling device 13 of the presence of such a gesture. One possible form of information reproduction may be, for example, to respond to incoming message gesture information with screen brightness modulation of the signaling device, e.g., in combination with the display of a participant's identification.

If the received output signal OS contains additional information, the output signal processing device 14 can output a processed signal, for example, that outputs the additional information as well, in particular by means of the output device 17, such as a signal that provides an indication about the user who is making the gesture or causing the output signal OS/motion signal MS.

The signaling device 13 is preferably designed such that it can access an external data source that links the gesture information with underlying output signal patterns. The external data source can be a memory card, a memory unit of an additional signal-transmitting device 2, an internal web-based or network storage unit, etc. It is also within the scope of the invention for the signaling device 2 to be self-learning.

It is also conceivable to design the signaling device 13 such that it does not include an output signal processing device 14. If, for example, at the output of the motion signal processing device 7 an output signal OS that is processed in a suitable manner for outputting via output device 17 is already available and said output signal can be transferred directly to said motion signal processing device, then reprocessing via an output signal processing device 14, for example, is not required. Such a solution is useful, for example, if the signal-transmitting device 2 and the signaling device 13 are housed in a joint device unit, e.g., in a joint mobile terminal 1. Transmitting via a transmission channel 11 could then be omitted.

With the signaling method according to the invention, a movement of the signal-transmitting device 2 is detected in a first step, for example via sensor 5, and a corresponding motion signal MS is output. The motion signal MS is generated as described above, for example by moving the signal-transmitting device 2 that is housed in a mobile terminal 1, for example around or along an axis A or B, etc.

In a further step, the motion signal MS is associated with a gesture that is part of the gesticulation of nonverbal interpersonal communication. This can be done by comparing motion signal patterns MSP with the motion signal MS as described above.

In a final step, an output signal OS is generated that contains information corresponding to the gesture that has been detected as a result of the association. In an additional step, this output signal OS can be transmitted to a transmission channel 11. Refer here to the preceding explanation.

The signaling method according to the invention includes the step of generating information based on the output signal OS and outputting the information, for example via an output device 17, said information being contained in the output signal OS and corresponding to the nonverbal interpersonal communication gesture.

Alternatively, the step of generating information can be omitted if the output signal OS can be transferred directly to an output device 17 in a suitably prepared manner. Refer here to the preceding explanation.

In a possible additional step, which may precede the step of generating or outputting the information, the output signal OS, which was transmitted via a transmission channel, is received, for example, by a receiving device 15, as discussed above.

Figure 6:
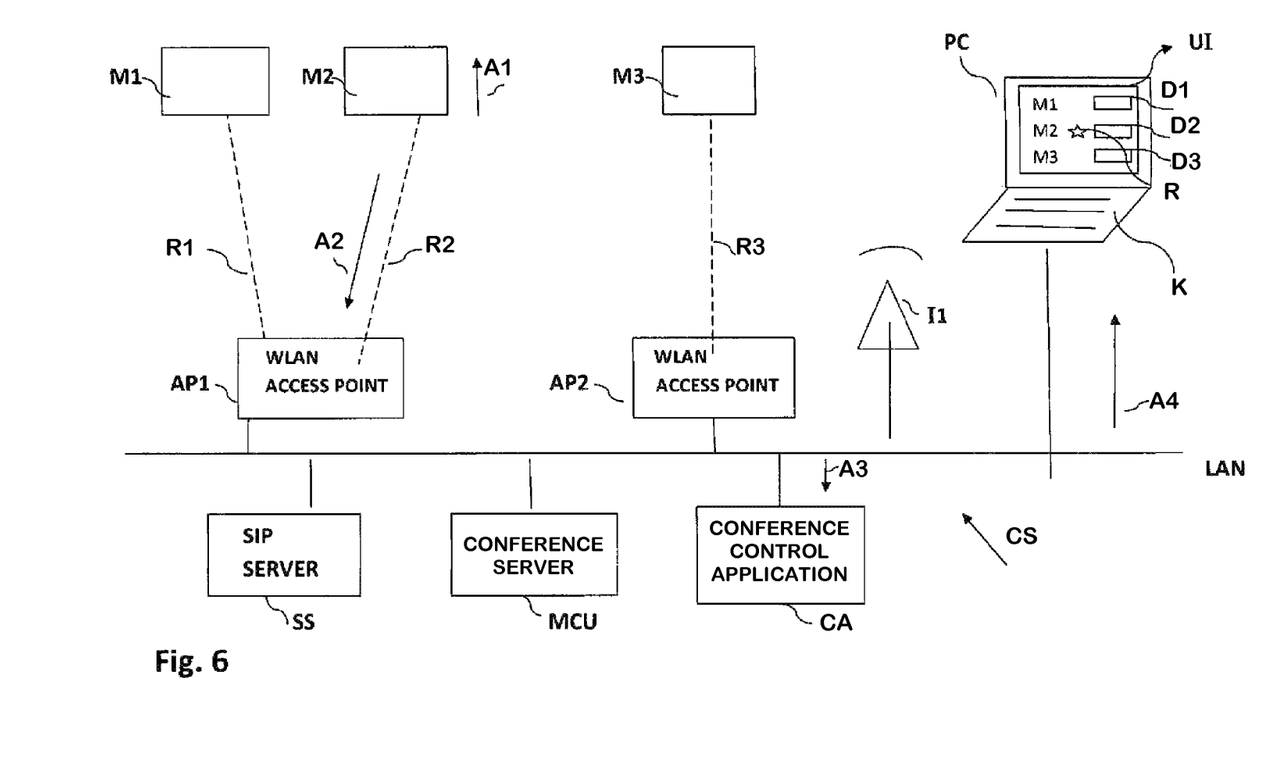
FIG. 6: a first embodiment of a conference system according to the invention using the signal-transmitting device.

FIG. 6 shows a first embodiment of a moderated conference system CS with three mobile terminals M1, M2 and M3, each constructed identically, as described below based on the example of the mobile terminal M2 in connection with FIG. 7. The two mobile terminals M1 and M2 are connected via a radio transmission path R1 or R2 to a first WLAN access point AP1, which is connected to a Local Area Network LAN. The third mobile device M3 is connected via the radio transmission path R3 to a second WLAN access point AP2, which is also connected to the same Local Area Network LAN.

Additionally connected to the Local Area Network LAN are a SIP Server SS, a conference server MCU, which may be designed, for example, according to the standard ITU-T H.323 (09/99), Sections 6.7 and 6.8, a conference control application CA, an IP phone 11 and a personal computer PC with a keyboard K. The conference server is responsible for media mixing (audio, video) and distributing the media stream to the mobile terminals M1 to M3 of the participants.

Figure 8:
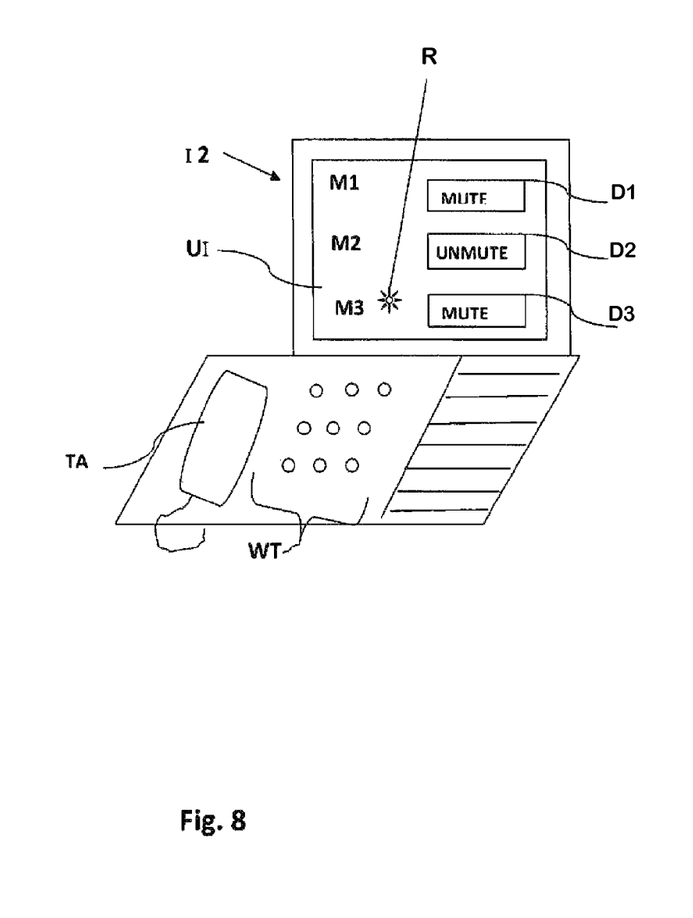
FIG. 8: an IP telephone with the display of a user interface for use in an additional conference system according to the invention.

The personal computer PC includes a touch screen as its screen which is controlled by the moderator as a touch user interface UI for conference control. The display on the touch screen UI, for example, uses the web protocol according to the IETF standard Hypertext Transfer Protocol-http/1.1 RFC 2616 (1999-06). Displayed on the touch screen UI, in special display fields D1, D2 and D3, are the respective switching states "mute" and "unmute" as well as possible requests to speak using a special symbol R for mobile terminals—see larger representation on the touch screen UI of an alternative internet telephone 12, which is shown in FIG. 8. FIG. 8 shows an alternative embodiment of an Internet phone 12 (in which a personal computer PC is omitted) having a telephone set TS with a dial pad DP and a touch screen with a touch user interface UI, where M1 and M3 are switched to "mute" and M2 is switched to "unmute". For M3, the request to speak R is present.

Figure 7:
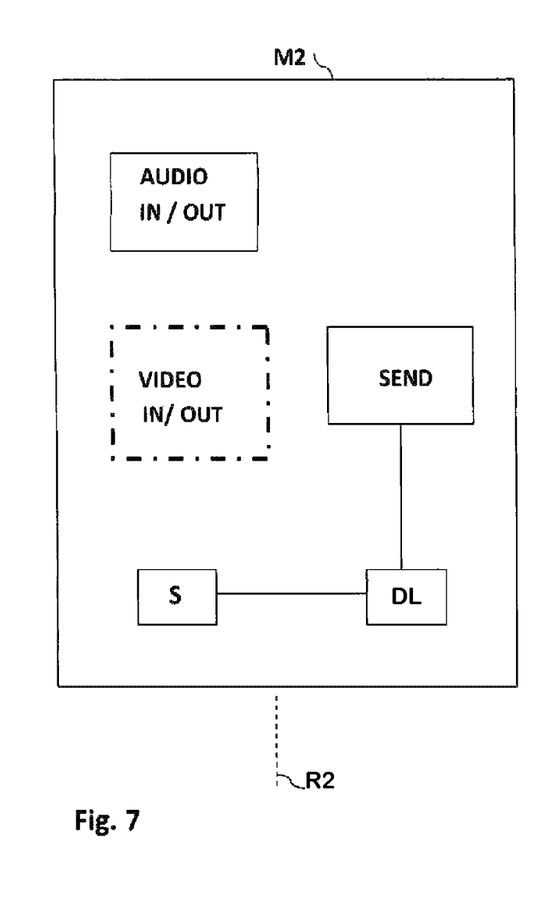
FIG. 7: a block diagram of a terminal used in the exemplary embodiment of the conference system shown in FIG. 6.

As can be seen in FIG. 7, each mobile terminal M1, M2 and M3 (only the mobile device M2 is shown) contains an "Audio in/out" unit to make phone calls and optionally either alternatively or additionally a "Video in/out" unit for displaying video images of the conference call. Also present is a sensor S that can be designed as a motion or acceleration sensor S, for example (corresponding to the sensor 5 in the mobile terminal 1 of FIG. 1).

An evaluation logic or detection logic DL (corresponds to the motion signal processing device 7 of the signal-transmitting device 2 in FIGS. 1 and 2) evaluates the detected movements accordingly, and its output signal (corresponding to OS in FIG. 2) from the transmitting unit SEND (corresponds to 10 in FIG. 2) is transmitted as an INFO message in addition to the audio/video signal via the radio link R2.

In the moderated conference system CS, the participants' mobile terminals M1, M2 and M3 are muted and unmuted by the moderator on the personal computer PC. The moderator has an overview of all participants and can execute this function via a control application that is connected to the conference system CS; in other words, he can give somebody the floor. The conference system CS according to the invention now has the advantage that muted conference participants can now make a request to speak. Such a request to speak can now be made from any mobile device, M1, M2 and M3, with a gesture such as shaking or sudden lifting, which functions like raising a hand, for example.

A movement is now detected using the motion sensor S in the mobile communication terminal M2 (see FIG. 7) and evaluated using an evaluation logic or detection logic DL to recognize the gestures, e.g., raising of the hand as a quick movement in the direction of arrow A1, as shown in FIG. 1. This information is now transferred, e.g. in the form of an INFO message (Standard RFC 2976) in the direction of the arrow A2 to the WLAN access point AP2 and then transmitted via SIP signaling from the SIP server SS to the conference control application CA (arrow A3). It can now interpret the "raising of the hand" of M2 semantically as a request to speak and transfer it to the touch user interface UI on the moderator's personal computer PC in the direction of the arrow A4 and display the symbol R. Here, all communication is based on the Internet protocol (IPv4 or IPv6). The mobile terminals are connected via wireless LAN (WLAN, ref. IEEE 802.1 1). The terminals M1, M2 and M3 as well as the moderator's IP phone 11 and the conference server MCU are registered via the Session Initiation Protocol (SIP, see RFC 3261) at the central SIP server.

After the display of the request to speak (R), the moderator can effect a change from mute to unmute or in the reverse direction for the mobile terminal M2 of a participant in the conference by the action of touching the screen on the touch user interface UI in the area of the display field D2, on the touch user interface UI within the conference user interface.

Figure 9:
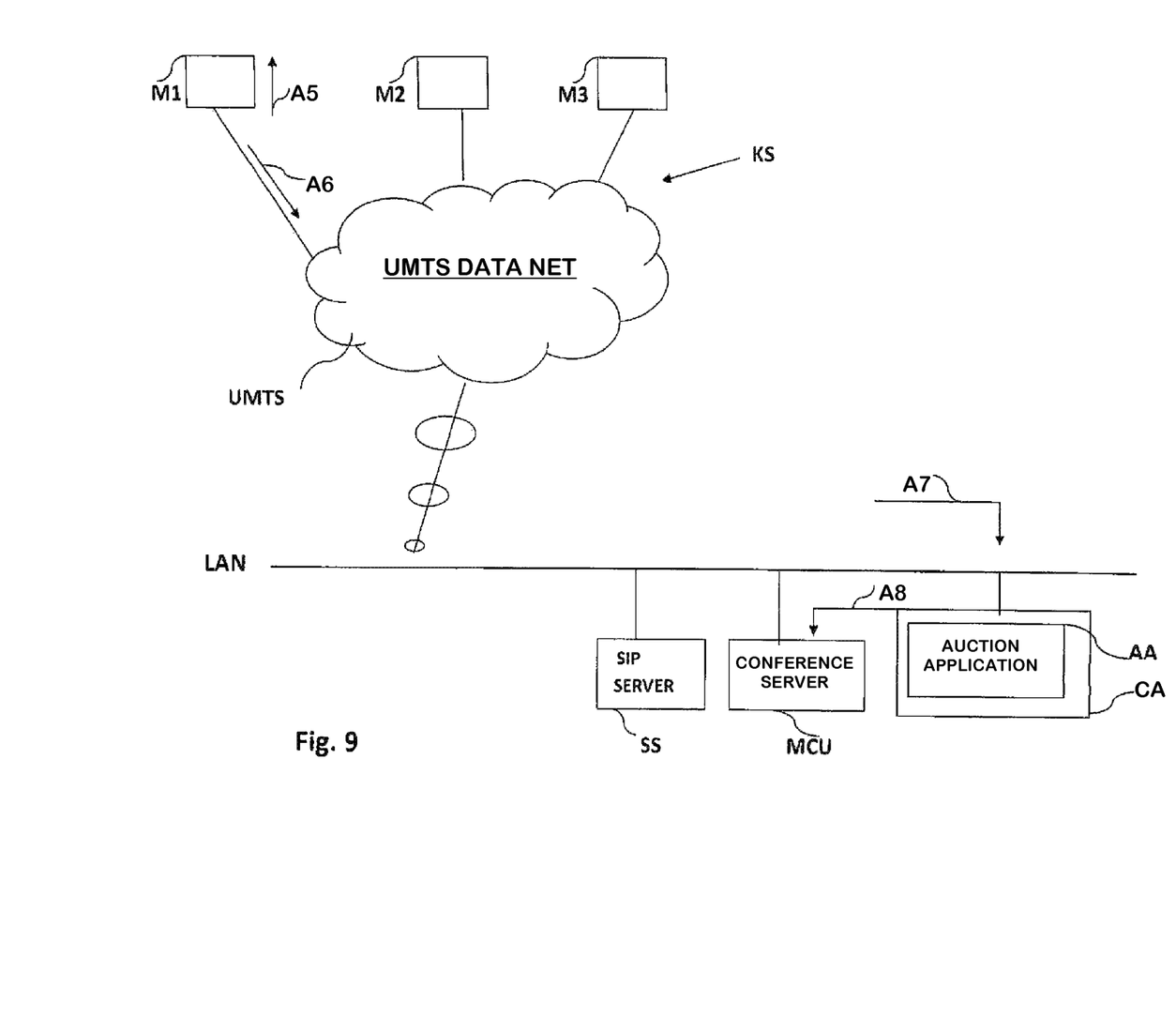
FIG. 9: a second embodiment of a conference system according to the invention for carrying out an auction by using the mobile terminals shown in FIG. 7.

An alternative possibility for the conference system CS is for a transfer from the mobile terminals M1, M2 and M3 to the Local Area Network LAN to be made via a UMTS data network CUMTS instead of a WLAN access point AP1 or AP2, as shown in FIG. 9. Alternatively, the information "raising of hand" can also be modeled into the audio signal (not necessarily audible).

In a modified first embodiment of the conference system CS according to the invention, a vote by the participants can be carried out in a simple way. The arrangement is similar to that shown in FIG. 6, but now, in a vote using a position sensor, for example, holding the mobile terminal upright is interpreted by the conference control application CA as "YES", holding it horizontally is interpreted as "NO", and again M1 to M3 are displayed accordingly for all participants in the display fields D1 to D3 on the touch user interface UI within the conference user interface.

A second embodiment of the conference system CS according to the invention shown in FIG. 9 represents an auction, similar to FIG. 6. Within the conference system CS, a moderator describes an object, for example, possibly even with video transmission to the participants. Alternatively, this description can also be carried out by a machine using electronic speech output (synthesized speech). When the auction starts, participants can increase the bid—similar to a real auction—even through hand signals, i.e., for example by quickly lifting the mobile terminal M1 in the direction of the arrow A5. Here again, a corresponding info message "raising of hand" is transmitted to the UMTS data network in the direction of the arrow A6 and on in the direction of the arrow A7 to the conference control application CA. The CA has implemented a special auction application AA with a "text to speech" component and interprets the message "raising of hand" as a bid, which results in a price increase by a certain amount, whereby the announcement of the new bid price occurs using the "text to speech" component through a transmission from the auctioneer, who is the moderator of the conference system CS, in the direction of the arrow A8 to the conference server MCU. Connected to the LAN are an Internet phone 11 and a personal computer PC, as shown in FIG. 1, or an Internet phone 12, as shown in FIG. 8 but not specifically shown in FIG. 9.

In the case of a fully automated auction, the conference control application CA will take over all functions of the auctioneer, i.e., even the audible announcements, and a visual display would then not be necessary. The price increase after the bid is announced acoustically, e.g., "100 Euro by participant 2" . . . . Going once, going twice, gone. All auction participants hear this announcement.

In a further embodiment of a conference system CS, which is not shown, gestures are used in a video conference, for example using the gesture "raising of hand" that will now be analyzed by the evaluation/detection logic DL connected to the camera in the video terminal. If the gesticulation is recognized, an INFO message "raising of hand" is also generated. Additional examples of gestures that are recognized via video: head shaking, head nodding, finger signs, e.g., thumbs up, thumbs down.

The recognized gesture is in turn transferred via the SIP server to the conference control application CA, which, depending on the application, carries out further interpretation and processing, e.g., interpretation of thumbs up or head nodding as an affirmation in a vote.

Another possibility for an action after the interpretation of a hand sign, is, for example, switching the video signal that is seen by all participants, which represents the change from presentation mode to an associated collaboration connection (e.g., display of screen images during the presentation).

We claim:

1. A communication system comprising:
    at least two mobile terminals each with a signal-transmitting device comprising:
        a sensor that detects a movement of the signal-transmitting device and outputs a corresponding motion signal for a nonverbal interpersonal communication gesture;
        a motion signal processing device that associates the motion signal with a motion signal pattern and generates an output signal with corresponding information about a type of nonverbal interpersonal communication gesture detected from the motion signal pattern;
        a transmitting device for supplying the output signal to at least one transmission channel, said at least one transmission channel associated with each of the mobile terminals;
    a local area network connected to said at least one transmission channel;
    a telephone, for a moderator connected to the local area network; and
    a screen for conference control connected to the local area network.

2. The communication system of claim 1, where the output signal comprises information that provides an indication as to an originator of the motion signal.

3. The communication system of claim 1, wherein the motion signal processing device detects a human nonverbal gesture of drawing attention for interhuman communication as a result of a movement of the signal-transmitting device contained in one of the at least two mobile terminals.

4. The communication system of claim 1, wherein the motion signal of a gesture associates the gesture with a motion signal pattern that is known to the signal-transmitting device or stored in the signal-transmitting device.

5. The communication system of claim 1, wherein the sensor and the motion signal processing device are designed to suppress unintentional nonverbal interpersonal communication gestures so that said gestures do not cause at least one of a motion signal and an output signal when the motion of the signal-transmitting device is determined to have a motion amplitude or a signal intensity that is below a pre-selected threshold.

6. The communication system of claim 1, wherein the signal-transmitting device processes and stores motion signal patterns from an external data source that is not part of the signal-transmitting device.

7. The communication system of claim 1, wherein the transmission channel is formed by a WLAN net with a WLAN access point or a UMTS data net.

8. The communication system of claim 1, wherein the signal-transmitting device in each of the at least two mobile terminals contains an output device that outputs the information of the output signal in a way selected from the group consisting of visually on a screen, acoustically, and as haptic stimuli, the output device outputting the information of the output signal such that the output information corresponds with the nonverbal interpersonal communication gesture.

9. The communication system of claim 1, wherein the screen that is connected to the local area network is designed as a touch user interface, which is housed in a personal computer, connected to the computer, or in the telephone.

10. The communication system of claim 1, further comprising:
    a SIP server;
    a conference server; and
    a conference application;
    wherein the SIP server, the conference server, and the conference control application, are connected to the local area network.

11. A signaling method for a communication system, comprising:
    detecting a motion of a signal-transmitting device and outputting a motion signal;
    associating the motion signal with a nonverbal interpersonal communication gesture;
    generating an output signal in response to an association between the motion signal and the gesture, said output signal comprising information that corresponds to the nonverbal interpersonal communication gesture;
    transmitting the output signal from a first device connected to the signal-transmitting device to a second device via a transmission channel;
    receiving the output signal that is transferred via the transmission channel by the second device; and
    displaying, by the second device, a respective marker that is associated with a mobile terminal on a screen for conference control based on the output signal received from the first device.

12. The signaling method of claim 11, wherein the first device is the mobile terminal, wherein a switching state of "mute" or "unmute" of the mobile terminal is also shown on the conference control screen in display fields and is modifiable depending on the marker, wherein this switching action is performed automatically or manually by a moderator.

13. A method for voting, comprising,
  detecting a motion of a signal-transmitting device and outputting a motion signal;
  associating the motion signal with a nonverbal interpersonal communication gesture;
  generating an output signal in response to an association between the motion signal and the gesture, said output signal comprising information that corresponds to the nonverbal interpersonal communication gesture;
  transmitting the output signal via a transmission channel;
  receiving the output signal that is transferred via the transmission channel and displaying a respective marker that is associated with a mobile terminal on a screen for conference control based on the received output signal; and
  evaluating two different motion forms of the signal-transmitting device as a "yes/no" decision.

14. A method for conducting an auction, comprising:
  performing a signaling method for a conference system, the signaling method comprising:
    detecting a motion of a signal-transmitting device and outputting a motion signal,
    associating the motion signal with a nonverbal interpersonal communication gesture,
    generating an output signal when an association is made, with said output signal containing information that corresponds to the nonverbal interpersonal communication gesture,
    transmitting the output signal via a transmission channel, and
    receiving the output signal that is transferred via the transmission channel, and displaying a respective marker that is associated with a mobile terminal on a screen for conference control; and
  wherein a "raising of a hand" motion of the mobile terminal by a participant is interpreted as a bid with a price increase by a certain amount, and wherein an announcement of a new bid price to participants occurs through one of an announcement by a moderator or a "text to speech" component.

15. The method of claim 14, further comprising evaluating and transferring to a transmission system information based on detected gestures of participants selected from the group consisting of raising a hand, head shaking, head nodding and finger signs.

16. A communication system comprising:
  at least two mobile terminals, each of the mobile terminals comprising a signaling apparatus having:
    a sensor configured to detect motion of the signaling apparatus and output a motion signal corresponding to the detected motion of the signaling apparatus,
    a motion signal processing device configured to associate the motion signal for a gesture of nonverbal inter-human communication with a motion signal pattern and generate an output signal based on the association of the motion signal with the gesture, the output signal having a piece of information about a type of the gesture that corresponds to the association of the motion signal to the gesture,
    the signaling apparatus configured to perform at least one of (i) processing of motion signal patterns and (ii) saving of motion signal patterns from an external data source that is not a part of the signaling apparatus;
  a transmission apparatus communicatively connected to the signaling apparatus, the transmission apparatus being configured to supply the output signal to at least one transmission channel allocated to each of the mobile terminals;
  a network connected to each transmission channel, the network having a control application;
  a moderator device connected to the network;
  a display device connected to the network for conference control, the display device being configured to generate a display based on the piece of information about the type of the gesture of the output signal; and
  the control application configured to effect unmute or mute switching for each of the mobile terminals by a moderator during a conference call connection between the mobile terminals and the moderator device.

17. The system of claim 16 wherein the moderator device is a telephone device or a computer.

18. The system of claim 16 comprising a conference server device configured to mix media and distribute media streams for the conference call connection to the mobile terminals and the moderator device.

19. The system of claim 16 wherein the display device is a touch screen of a computer.

20. The system of claim 16 wherein the display generated by the display device is configured such that the display illustrates indicia indicating a mute status for each of the mobile terminals and request indicia to indicate a request to change the mute status has been received for communicating mute status and request data to the moderator based on the piece of information about the type of the gesture of the output signal.

* * * * *